(12) United States Patent
Lin et al.

(10) Patent No.: US 8,869,205 B2
(45) Date of Patent: Oct. 21, 2014

(54) METHOD AND SYSTEM FOR VIDEO COLLECTION MANAGEMENT, INVALID VIDEO REPLACEMENT AND CONTINUOUS VIDEO REPLAY

(71) Applicant: Industrial Technology Research Institute, Hsinchu (TW)

(72) Inventors: Guan-Rong Lin, Yunlin County (TW); Shun-Min Hsu, Hsinchu County (TW); Chih-Yuan Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/862,467

(22) Filed: Apr. 15, 2013

(65) Prior Publication Data

US 2014/0068676 A1    Mar. 6, 2014

(30) Foreign Application Priority Data

Aug. 28, 2012 (TW) .............................. 101131218 A (51) Int. Cl.
- *H04N 5/445* (2011.01)
- *G06F 3/00* (2006.01)
- *G06F 13/00* (2006.01)
- *H04N 21/431* (2011.01)
- *H04N 21/234* (2011.01)
- *H04N 21/482* (2011.01)
- *H04N 21/462* (2011.01)

(52) U.S. Cl.
CPC ........... *H04N 21/431* (2013.01); *H04N 21/234* (2013.01); *H04N 21/4828* (2013.01); *H04N 21/462* (2013.01)
USPC ............................... 725/44; 725/133; 725/134

(58) Field of Classification Search
CPC ....................... H04N 21/2387; H04N 21/8455
USPC ........................................ 725/44, 88, 87, 104
See application file for complete search history.

(56) References Cited

U.S. PATENT DOCUMENTS

2005/0125569 A1* 6/2005 Swidler et al. .................... 710/8
2010/0057782 A1* 3/2010 McGowan et al. ......... 707/104.1

* cited by examiner

*Primary Examiner* — Mark D Featherstone
*Assistant Examiner* — Tien M Nguyen
(74) *Attorney, Agent, or Firm* — Jianq Chyun IP Office (57) ABSTRACT

A method and a system for video collection management are provided. The method and the system can gather related videos in a network, classify the videos into multiple channels and recommend the channels to be viewed by the user. The method and the system can check the videos of the channels periodically to determine whether the videos are valid or invalid and search for other videos to replace the invalid videos. The method and the system also provide continuous, cross-apparatus and cross-channel video replay.

2 Claims, 6 Drawing Sheets

METHOD AND SYSTEM FOR VIDEO COLLECTION MANAGEMENT, INVALID VIDEO REPLACEMENT AND CONTINUOUS VIDEO REPLAY

CROSS-REFERENCE TO RELATED APPLICATION

This application claims the priority benefit of Taiwan application serial no. 101131218, filed on Aug. 28, 2012. The entirety of the above-mentioned patent application is hereby incorporated by reference herein and made a part of this specification.

BACKGROUND

1. Technical Field

The disclosure is directed to a method and a system for video collection management, invalid video replacement and continuous video replay.

2. Related Art

Along with the continuously increasing bandwidth of the Internet, videos provided on networks are also increased day by day. Many well-known Internet enterprises have also set up websites for users to share videos produced by themselves or authorized TV programs and movies. Therefore, users can search among source websites of the videos for the desired videos or directly search for the videos on the internet by using various types of search engines. Currently, the videos are managed by the source websites by their own ways, and the videos provided therefrom are separated and fragmented, which are not collectively managed.

Further, connect TV has risen, which features in Internet interaction and watching Internet videos available through the networking connection among each device in the home. In a typical TV channel, related programs having attributes in common are collected and played continuously while a user interface of the current connect TV is more like a personal computer rather than the typical TV channel.

SUMMARY

The disclosure is directed to a method and a system for video collection management capable of gathering related videos in a network, classifying the videos into multiple channels and recommending the channels to be viewed by users. The method and the system is also capable of checking the videos of the channels periodically to determine whether the videos are valid or invalid and searching for other videos to replace the invalid videos. The method and the system also provide continuous, cross-device and cross-channel video replay.

A method for video collection management is introduced in the disclosure, which includes steps as follows. A plurality of videos matching a predetermined condition in a network is gathered. A plurality of attributes of each of the videos is retrieved and recorded. The videos are classified into multiple channels according to a similarity degree among the attributes of the videos by using a clustering algorithm. A user interface for a user to subscribe at least one of the channels is provided.

A method for invalid video replacement is further introduced in the disclosure, which includes steps as follows. Multiple channels are provided, wherein each of the channels includes a plurality of videos. Whether the videos in at least one of the channels are invalid is checked periodically. If there is an invalid video, another video having a highest similarity degree with the invalid video is selected from an associated channel of the channel of the invalid video, and the invalid video is replaced with the another video. The similarity degree is calculated based on the attributes of the videos.

A method for continuous video replay is yet further introduced in the disclosure, which includes steps as follows. A first video is played for a user. Last viewing information of the first video viewed by the user is recorded in a server of a network. A replay starting position of a second video is determined according to the last viewing information. The second video is played from the replay starting position for the user.

A method for video collection management, which includes main steps of the aforementioned three methods, is still further introduced in the disclosure.

A system for video collection management is also introduced in the disclosure, which includes a server and a playing apparatus. The server gathers a plurality of videos matching a predetermined condition in a network, retrieves and records a plurality of attributes of each of the videos and classifies the videos into multiple channels according to a similarity degree among the attributes of the videos by using a clustering algorithm. The playing apparatus is coupled to the server through the network and provides a user interface for a user to subscribe channels.

A system for invalid video replacement is further introduced in the disclosure, which includes a server and a playing apparatus. The server provides multiple channels, wherein each of the channels includes a plurality of videos. In addition, the server checks periodically whether the videos in at least one of the channels is invalid. If there is an invalid video, the server selects another video having a highest similarity degree with the invalid video from an associated channel of the channel of the invalid video and replaces the invalid video with the another video. The similarity degree is calculated based on the attributes of the videos. The playing apparatus is coupled to the server through a network and plays the videos.

A system for continuous video replay is yet further introduced in the disclosure, which includes at least playing apparatus and a server. The server is coupled to the playing apparatus through a network, provides a source website of a first video for a first playing apparatus among the playing apparatuses to play the first video for a user. Besides, the server records last viewing information of the first video viewed by the user, determines a replay starting position of a second video according to the last viewing information and provides a source website and the replay starting position of the second video for a second playing apparatus among the playing apparatuses to play the second video from the replay starting position for the user.

A system for video collection management, which includes main functions of the aforementioned three types of systems, is still further introduced in the disclosure.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
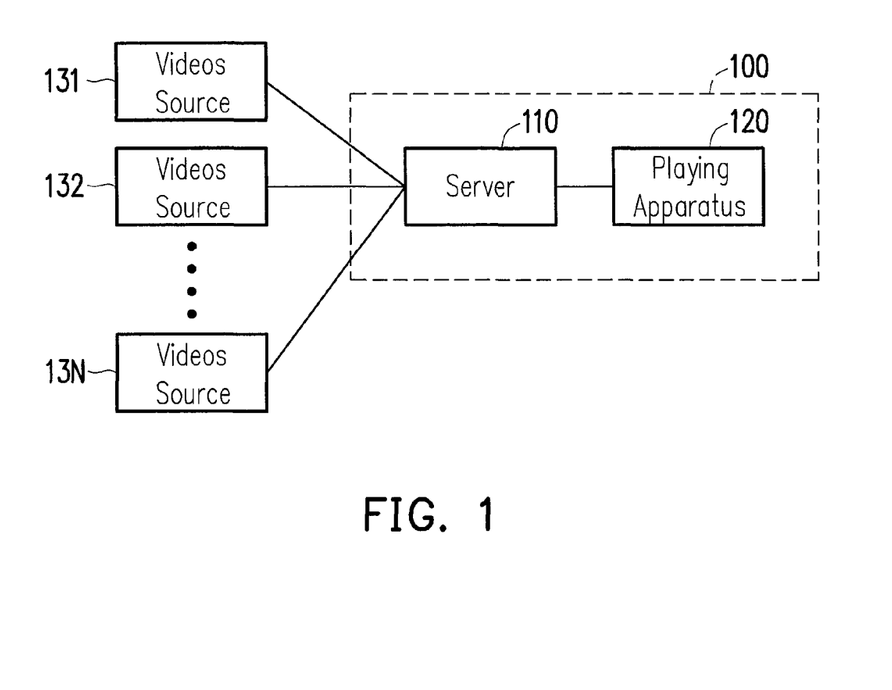
FIG. 1 is a schematic diagram illustrating a system for video collection management according to an embodiment of the disclosure.

FIG. 1 is a schematic diagram illustrating a video collection management system 100 according to an embodiment of the disclosure. The video collection management system 100 includes a server 110 and a playing apparatus 120. The playing apparatus 120 is coupled to the server 110 through a network. The server 110 gathers videos in the network, classifies the videos into multiple channels according to a similarity degree among the videos, recommends a user to subscribe the channels through the playing apparatus 120, plays the videos of the channels by using the playing apparatus 120. The playing apparatus 120 may be an electronic device having a networking and a video playing functions, such as a connect TV, a desktop computer, a notebook computer, a tablet computer or a smart phone.

Figure 4:
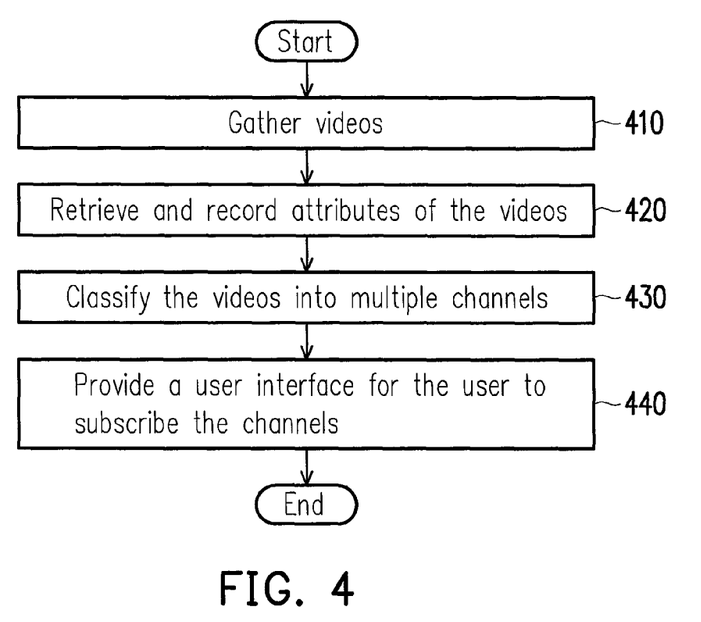
FIG. 4 through FIG. 7 are flowcharts illustrating a method for video collection management according to an embodiment of the disclosure.

FIG. 4 is a flowchart illustrating a method for video collection management according to an embodiment of the disclosure. This method may be performed by the video collection management system 100. In step 410, the server 110 gathers a plurality of videos matching a predetermined condition from a network. The network may be a local area network (LAN), and Internet or a combination of two or more networks. The videos are from a plurality of videos sources 131~13N in the network, wherein N is a positive integer. The videos sources 131~13N are typically various websites for providing videos to the public. If the video collection management system 100 is connected with the Internet, the videos sources 131~13N may cover a worldwide range. The videos include videos that are recorded and uploaded by a general user himself/herself or commercially authorized TV programs or movies.

The predetermined condition is configured to filter the videos to avoid collecting too many videos that are not attractive to the general user. For example, the predetermined condition may be configured to limit a selected ratio. The so-called selected ratio is the ratio of selected videos. In other words, the videos whose click numbers within a latest time period are greater than or equal to a predetermined threshold may be gathered in step 410. For example, the predetermined threshold may be set to gather the videos whose click numbers within a latest predetermined time period are ranked as the highest 10% or 30% in all of the videos. Thus, a collection of more popular videos is gathered, which includes the videos that are more attractive to the users or more representative. The predetermined condition may be also set according to attribute of the videos, but the disclosure is not limited thereto. For example, it may be only the video having specific key words contained in a title or in a description gathered in step 410.

In step 420, the server 110 retrieves and records a plurality of attributes of each gathered video. The attributes may partially or entirely includes a title, a publisher, a click number, an evaluation, a description, a category, a source uniform resource locator (URL), a source website, video definition, frames, tags, uploaded time of each of the videos, and any combination of the above. The tags are referred to key words used by a publisher of a video to describe the video when uploading the video. In step 430, the server 110 classifies the videos into multiple channels according to a similarity degree among the attributes of the videos by using a clustering algorithm. For example, in this step, different episodes of the same TV program are classified into the same channel. Also, videos associated with the same news event or the same news person may be also classified into the same channel. In step 440, the playing apparatus 120 provides a user interface for the user to select and subscribe any amount of the channels. The user may plays the videos in the subscribed channels by the using the playing apparatus 120.

Each channel provided by the server 110 is like a typical TV channel, in which similar and related programs are collected and continuously played. The playing apparatus 120 is operated similarly to a typical television, where the user just needs to turn on the playing apparatus 120 and selects a subscribed channel, and the video in the channel is then continuously watched. Thus, the user neither has to use key words to search for related videos himself/herself nor has to spend time on selecting the video to be watched among numerous searching results.

Figure 2:
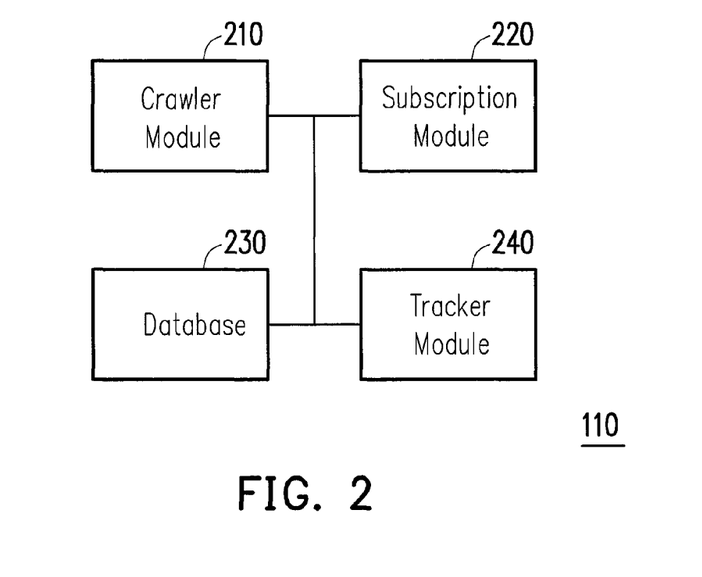
FIG. 2 is a schematic diagram illustrating a server according to an embodiment of the disclosure.

FIG. 2 is a schematic diagram illustrating a server 110 according to an embodiment of the disclosure. The server 110 includes a crawler module 210, a subscription module 220, a database 230 and a tracker module 240. The aforementioned modules 210, 220 and 240 and the database 230 are coupled with one another, and each of the modules 210, 220 and 240 and the database 230 may be a software module or a hardware device.

The crawler module 210 gathers the videos matching the predetermined condition from the network, retrieves the attributes of each of the videos and classifies the videos into the multiple channels according to the similarity degree among the attributes of the videos by using the clustering algorithm. The crawler module 210 recommends the channels to be subscribed by the user using the subscription module 220 according to the click numbers of the videos or any other attribute. The crawler module 210 searches if there is any new video to be added in the channels. The crawler module 210 also detects whether the videos of each channels is valid or invalid, and searches for other similar videos to replace the invalid videos.

The subscription module 220 provides a description of a user interface for the playing apparatus 120, and the description of the user interface is provided in a hypertext markup language (HTML) format, for example, so that the user interface is presented by the playing apparatus 120. The user interface may be a graphical user interface (GUI) or a user interface presented in any other format. The subscription module 220 receives the recommended channel that is generated by the crawler module 210 and informs the tracker module 240 of the channels subscribed by the user. In addition to the above-described method, by which the channels are created according the similarity degree, the server 110 may also allow the user to search by key words to create and subscribe channels. Thus, the subscription module 220 may send the key words provided by the user to the crawler module 210 and also receive the channels searched and created by the crawler module 210 according to the key words so that the user himself/herself or others may subscribe the channels.

The database 230 records all required information including a plurality of attributes of each of the videos, the channels, the channels subscribed by the user, associated channels of the channels subscribed by the user, the last viewing information of each of the channels viewed by the user and the key words used by the user in the aforesaid searching.

The tracker module 240 receives a notifying message regarding a channel that is newly subscribed by the user from the subscription module 220 to update the database 230. The tracker module 240 also receives a notifying message regarding a channel that is unsubscribed by the user from the subscription module 220 to update the database 230. The tracker module 240 also accesses the crawler module 210 so as to record the associated channels of the channels subscribed by the user in the database 230 or to update records regarding the associated channels in the database 230. Additionally, the tracker module 240 tracks the channels periodically, that is, checks whether there are any videos to be added in or removed from the channels. To newly add videos or to remove videos as described above, the crawler module 210 is required. The tracker module 240 may also only track important channels, for example, the channels subscribed by the user and the associated channel thereof. The tracker module 240 may also track all of the channels.

Figure 3:
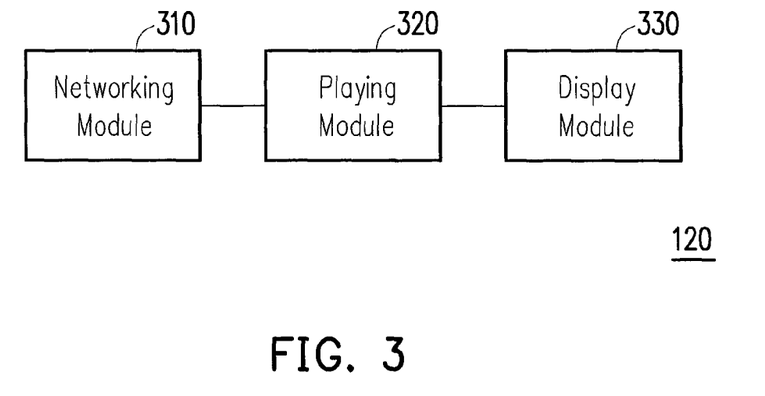
FIG. 3 is a schematic diagram illustrating a playing apparatus according to an embodiment of the disclosure.

FIG. 3 is a schematic diagram illustrating a playing apparatus 120 according to an embodiment of the disclosure. The playing apparatus 120 includes a networking module 310, a playing module 320 and a display module 330. The playing module 320 is coupled to the networking module 310 and the display module 330. Each of the networking module 310, the playing module 320 and the display module 330 may be a software module or a hardware device.

The networking module 310 delivers information in connection with the channels and the videos between the server 110 and the playing apparatus 120. The playing module 320 receives a description of the user interface from the server 110 through the networking module 310 and controls the display module 330 to present the user interface. The display module 330 may be an externally connected or embedded display that is capable of displaying the played videos and information related thereto. The playing module 320 also receives source URLs of the videos of the channels subscribed by the user from the server 110 through the networking module 310 and controls the display module 330 to play the videos of the channels subscribed by the user according to the source URL. When playing a video, the playing module 320 may execute functions such as pause, replay, stop, fast forward and rewind in response to the user's operation.

Figure 5:
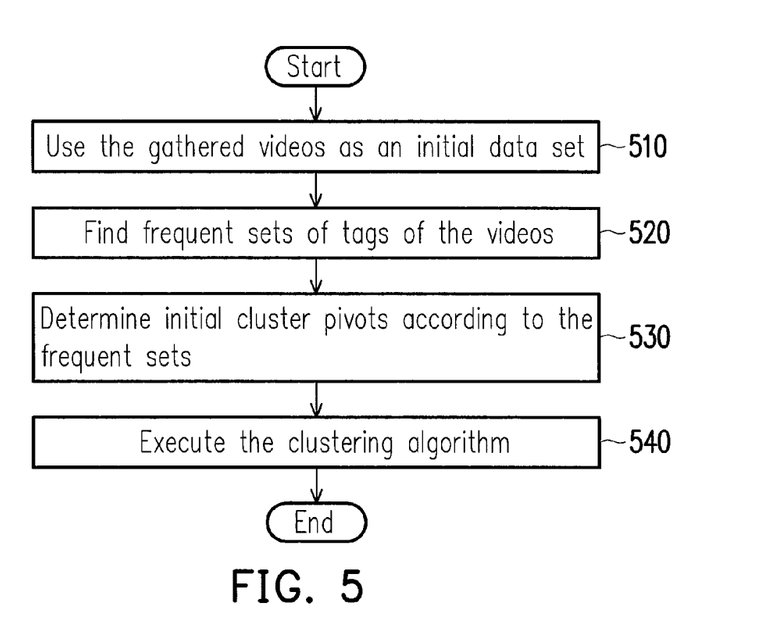

FIG. 5 illustrates a detailed process of step 430 in FIG. 4. Such process may be performed by the crawler module 210. In step 430, each attribute of a video corresponds to a dimension for forming a multi-dimension and multi-type space. Each video corresponds to a node of the multi-dimension and multi-type space. The aforementioned "multi-type" is referred to the attribute including multiple data types. In step 430, the videos are classified into multiple clusters according to distance between the corresponding nodes of the videos by using the clustering algorithm, wherein each cluster corresponds to one of the channels.

As for the clustering algorithm used in step 430, in the present embodiment, an improved K-means algorithm is used. In brief, in a traditional K-means algorithm, a plurality of cluster pivots is selected, each node is classified into a cluster represented by a cluster pivot that is nearest to the node and then, the cluster pivot is recalculated. The steps of clustering and recalculating the cluster pivot are repeated until all the cluster pivots and the result of clustering are no longer changed. Details of the K-means algorithm have been discussed in numerous papers and technical articles, which will not be repeated hereinafter and only the improved part is described according to the present embodiment as below.

In step 510, the crawler module 210 uses the videos gathered in step 410 as an initial data set of the clustering algorithm. Then, in step 520, a plurality of frequent sets of tags of the videos is found. The crawler module 210 converts the initial cluster pivot of the searching to a frequent item set for searching. A frequent item set is searched by using an Apriori algorithm that is well-known in the data mining field. An item as described above is a tag of a video, and a frequent item set is a frequent set of tags of the video. The tags that appear together frequently may become a frequent set. For example, the tags may be a name of a famous athlete and a sport item that he/she devotes to. If a single tag appears frequently enough, the tag itself may also become a frequent set.

Step 520 is merely an example, and the disclosure is not intent to limit to the frequent set of tags for searching videos. In other embodiments, if the gathered videos have one or more attributes applied to the aforementioned Apriori algorithm, these attributes may be partially or entirely used for searching the frequent set.

To be continued, in step 530, the crawler module 210 determines initial cluster pivots of the clustering algorithm according to the frequent sets. Then, in step 540, the clustering algorithm is executed to classify the videos gathered in step 410 into multiple channels. As previously discussed, in the present embodiment, the clustering algorithm is executed by using the K-means algorithm, and the K-means algorithm of the present embodiment is used to calculate a distance between two videos by a multi-attribute similarity operator.

$$sim(P_1, P_2) = \frac{\sum_{i=1}^{N} sim(A_{1\_i}, A_{2\_i}) \times W_i}{\sum_{i=1}^{N} W_i} \quad (1)$$

Formula (1) is the above-mentioned multi-attribute similarity operator. In formula (1), a similarity degree $sim(P_1, P_2)$ between two videos $P_1$ and $P_2$ is calculated. The higher similarity degree represents the stronger relevance between the two videos, and a reciprocal of the similarity degree $sim(P_1, P_2)$ is the distance between the videos $P_1$ and $P_2$. Such distance is the clustering base of the K-means algorithm according to the present embodiment.

The similarity degree $sim(P_1, P_2)$ is generated by calculating a similarity degree among various attributes of the videos $P_1$ and $P_2$. Which attributes is actually used to calculate the similarity degree $sim(P_1, P_2)$ depends on application requirements. In formula (1), N is an amount of the attributes used to calculate the similarity degree, i is an assigned number of each attribute, $A_{1\_i}$ is the $i_{th}$ attribute of the video $P_1$, $A_{2\_i}$ is the $i_{th}$ attribute of the video $P_2$, $sim(A_{1\_i}, A_{2\_i})$ is a similarity degree between the $i_{th}$ attributes of the videos $P_1$ and $P_2$ and $W_i$ is a weight corresponding to each $i_{th}$ attribute. The weight $W_i$ may be set according to application requirements. With reference to formula (1), the similarity degree between the videos $P_1$ and $P_2$ is weighted average value of the similarity degree between the attributes therebetween.

As discussed above, each video has a plurality of attributes including numerical values and texts. In the data mining field, there are numerous methods used to calculate the similarity degree or the distance among various types of attributes. The similarity degree and the distance are reciprocals for each other and easy for conversion. For example, among the attributes, a distance between titles may be calculated by using an edit distance method, a similarity degree between descriptions may be calculated by using a term frequency-inverse document frequency (TF-IDF) algorithm, a similarity degree between tags may be calculated by using a hit ratio method. The so-called hit ratio means how many tags are the same or similar between videos. A similarity degree between categories and publishers may be calculated by using an exact matching method, a similarity degree between source URLs and source websites may be calculated by using a partial matching method, a similarity degree between frames may be calculated by using a feature comparison model and a similarity degree between click numbers may be calculated by using absolute value, which are all typical terms in the data mining field. In addition, there are still a lot of calculation methods that can be chosen, and the disclosure is not limited thereto.

After executing the clustering algorithm, the crawler module 210 may select and recommend unique channels to be subscribed by the user. For example, the crawler module 210 may calculate, for each of the channels, a distance mean of all the videos and the cluster pivot of the channel, an average click number of all the selected videos within a latest predetermined time period and/or an average uploaded time of all the videos. And, according to the distance mean, the average click number and/or the average uploaded time, the crawler module 210 may recommend at least one of the channels to be selected and subscribed by the user.

For any one of the channels, the distance mean of the channel may be calculated by formula (2) as follows, wherein $\overline{X}$ is distance mean of the channel, n is an amount of the videos in the channel, $X_i$ is a distance between a video I and the cluster pivot of the channel.

$$\overline{X} = \frac{1}{n}\sum_{i=1}^{n}(X_i) \quad (2)$$

For example, the crawler module 210 may recommend the user $N_1$ channels having the smallest distance mean as the most associated channels, $N_2$ channels having the highest average click numbers as the most popular channels and $N_3$ channels having the average uploaded time that is the nearest as the latest channels. $N_1$, $N_2$ and $N_3$ are predetermined positive integers.

Figure 6:
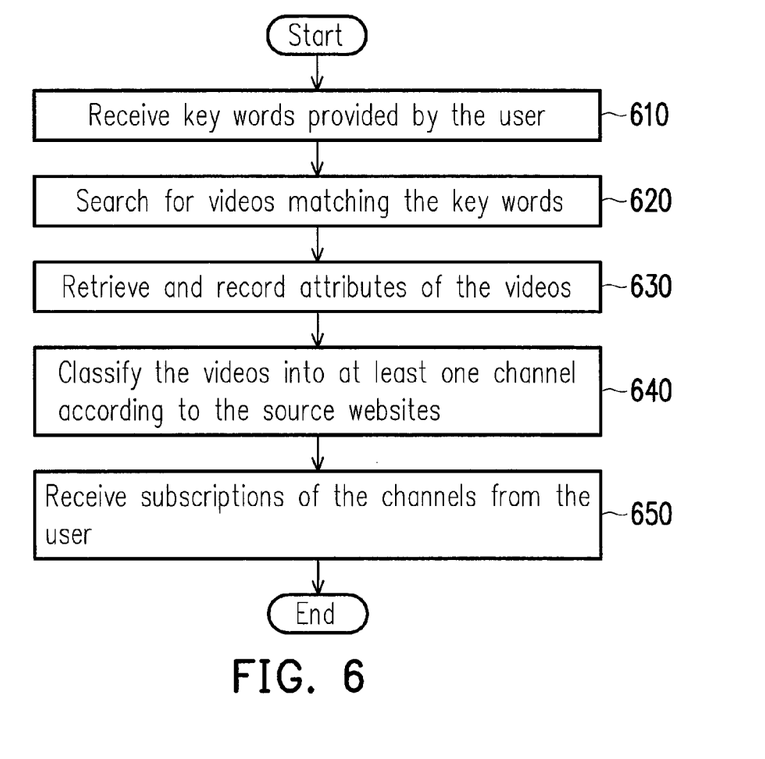

Further, in step 540, in addition to creating the channels by using the clustering algorithm, the server 110 may also allow the user to search by key words to create and subscribe the channels. Such part of the process is illustrated in FIG. 6. In step 610, the subscription module 220 receives one or more key words provided in the user interface by the user. In step 620, the crawler module 210 uses the key words to search for one or more videos matching the key words. In step 630, the crawler module 210 retrieves a plurality of attributes of each video obtained from the searching. The attributes have been described above, and will not be repeated. In step 630, the database 230 records the attributes of each video obtained from the searching. In step 640, the crawler module 210 classifies the videos obtained from the searching into one or more channels according to source websites of the videos. For example, each channel may correspond to one source website. The crawler module 210 may records theses channels in the database 230, inform the subscription module 220 and send the same to be displayed by the playing apparatus 120 for the user to subscribe. In step 650, the subscription module 220 receives subscriptions of the channels from the user through the user interface.

After the channels are subscribed, the user may view the subscribed channels easily by selecting on the user interface of the playing apparatus 120, without repeated searching by using key words every time.

The tracker module 240 may periodically update the videos in each channel. In detail, the tracker module 240 may periodically control the crawler module 210 to gather one or more new videos from the network. The aforementioned new videos are videos that are not yet published or does not match the predetermined condition in the previous gathering and match the predetermined condition in the current gathering. For each new video, the crawler module 210 may identify a channel having a cluster pivot nearest to the new video among the channels that are recorded in the database 230 and adds the new video in the channel. Likewise, the crawler module 210 retrieves attributes of the new video and records the attributes in the database 230.

Moreover, the tracker module 240 may also periodically update videos of specific channels. Such specific channels may be the channels subscribed by the user, the channels composed of TV series or the channels specifically designated by the user. For example, the crawler module 210 may classify videos belonging to the TV series into a channel, and the tracker module 240 may periodically check whether there is any new video of the TV series available to be added in the channel. The crawler module 210 may also classify competition events of a famous athlete into a channel, and the tracker module 240 may periodically check whether there is any video about a new competition event available to be added in the channel.

As discussed above, the crawler module 210 may periodically gather videos from the network and entirely record attributes of the gathered videos in the database 230. Therefore, for the specific channels that need the aforesaid updates, the new videos may be directly searched in the database 230. If a certain channel needs the updates, the tracker module 240 may query the database 230, that is, search for one or more new videos in one or more associated channels of the channel recorded in the database 230 and add the new video in the channel. A query condition of the tracker module 240 is that a similarity degree between the new video and the latest video of the channel has to be greater than a predetermined threshold and a published time of each new video has to be later than the latest video.

Regarding the definition of the associated channel, when the channel is generated by using a clustering algorithm illustrated in FIG. 5, the associated channel is a channel among the channels recorded in the database 230, which has a distance from the channel smaller than a predetermined threshold. When the channel is generated in the searching by using the key words illustrated in FIG. 6, the associated channel is a channel belonging to the same key words as the channel but from a different source website.

A similarity degree between the new video and the latest video of the channel is calculated by using the multi-attribute similarity operator of formula (1) and multiple pre-selected video attributes. The attributes used in the above-mentioned calculation may partially or entirely include a category, a channel name, a title, a brief introduction and tags.

The tracker module 240 may periodically control the crawler module 210 to check whether the videos of the channel is valid or invalid and whether the videos still match the predetermined condition. The predetermined condition is referred to the predetermined condition used in the gathering in step 410. For any one of the videos, if the video is still able to be played by using the source URL of the videos, the video is valid; otherwise, the video is invalid. The reason why the video becomes invalid may include the following, for example, the source website is shut down, the source website no longer shares videos, the source URL is incorrect, or the file of the video is damaged. The tracker module 240 may remove the video that is already invalid or no longer matches the predetermined condition from the channel recorded in the database 230 to maintain the quality of the channel.

Figure 7:
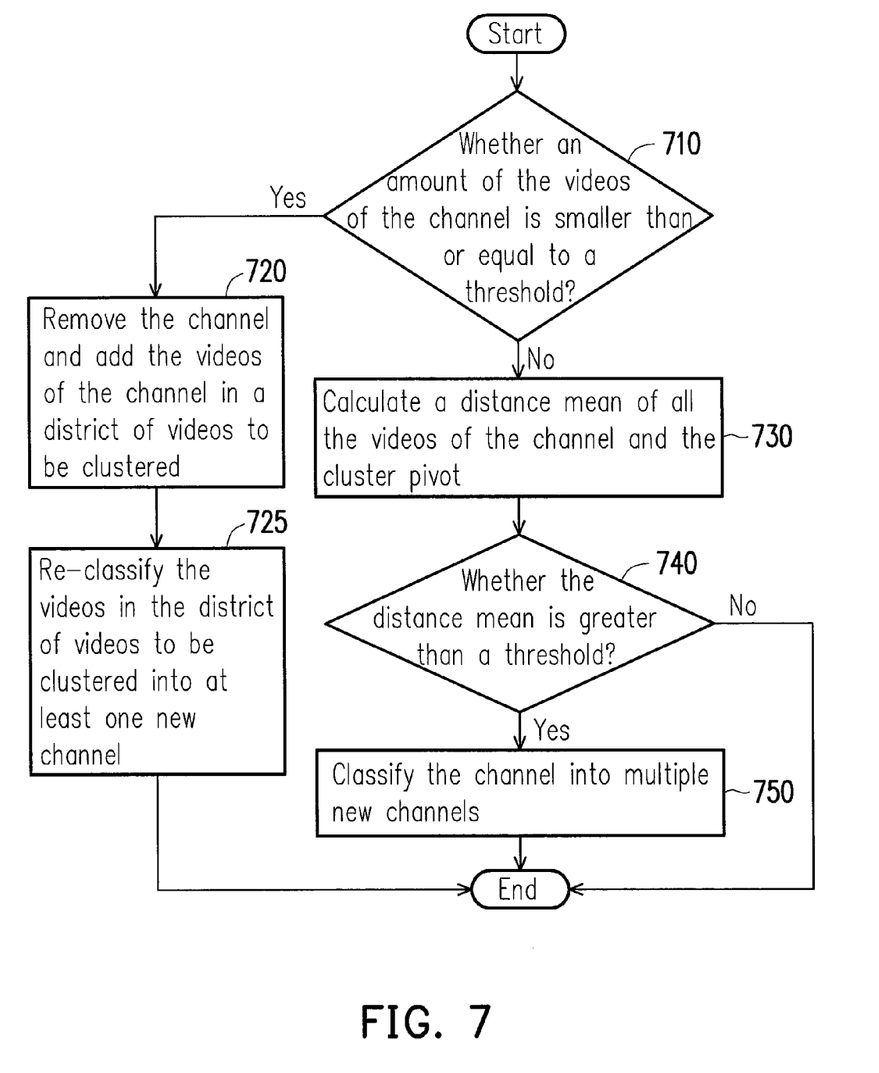

For each channel recorded in the database 230, when there are any videos added in or removed from the channel, the crawler module 210 or the tracker module 240 executes the process illustrated in FIG. 7 for the channel. First, in step 710, whether an amount of the videos of the channel is smaller than or equal to a predetermined threshold is checked. When the amount of the videos of the channel is smaller than or equal to the predetermined threshold, the process enters step 720. In step 720, the channel is removed and all the videos of the channel are then added in a district of videos to be clustered. Afterward, in step 725, the videos in the district of videos to be clustered may be periodically re-classified into at least one new channel by using the clustering algorithm. The new channel as mentioned above is newly created and different from the original channel. On the other hand, when the amount of the videos of the channel is greater than the predetermined threshold, the process enters step 730. In step 730, a distance mean of all the videos of the channel and the cluster pivot of the channel is calculated. A greater distance mean represents a looser relevance among the videos of the channel. Regarding selecting the cluster pivot, any one of the videos of the channel that has the smallest distance mean with each of the other videos is selected as the cluster pivot of the channel.

Then, in step 740, whether the distance mean calculated in step 730 is greater than a predetermined threshold is checked. The threshold of step 710 is different from the threshold of step 740. When the distance mean calculated in step 730 is greater than the predetermined threshold, the process enters step 750. In step 750, the channel is further classified into multiple channels by using the clustering algorithm, and for each new classified channel, all the steps illustrated in FIG. 7 are performed by a recursion method. In the clustering of step 750, only the channel having the distance mean greater than the threshold require to be clustered; otherwise, the channel remains unchanged.

In the periodical checking, the periodical updating and the periodical removing steps, each channel and the videos therein may be gradually changed with the trends of the click numbers and the tags. For example, channels may be created for hot topics or news events, and videos therein may be gradually increased, and when the topics or news events are cooled down, the videos become less and less until the corresponding channels are disappeared.

As discussed above, the tracker module 240 may periodically remove invalid videos. In another embodiment of the disclosure, others videos may be further searched to replace the invalid videos. Thus, even though the original videos are already invalid, the user may still view the replaced videos that are same as or highly similar to the invalid videos without searching for replaceable videos in the network.

Figure 8:
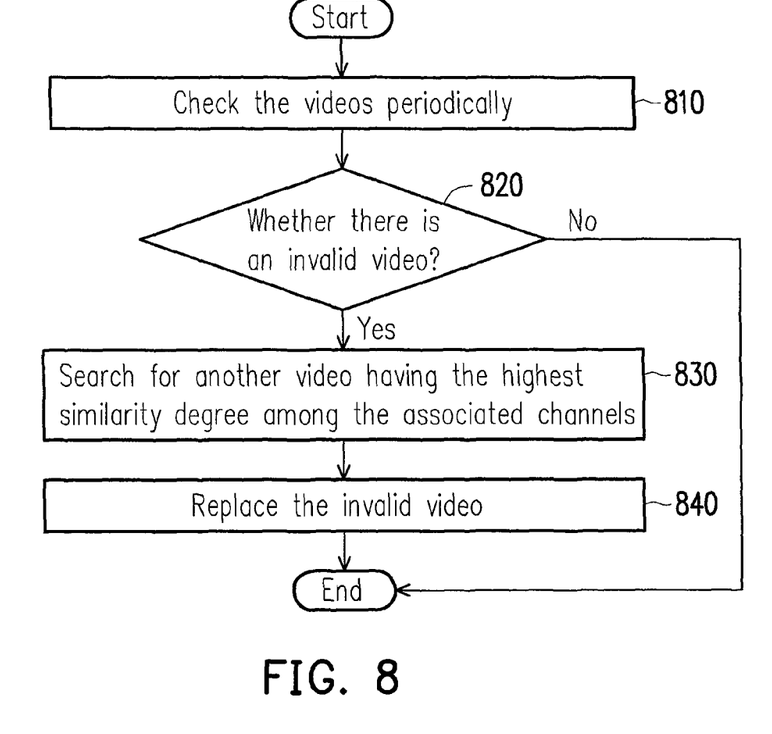
FIG. 8 is a flowchart illustrating a method for invalid video replacement according to an embodiment of the disclosure.

FIG. 8 is a flowchart illustrating a method for invalid video replacement according to an embodiment of the disclosure. In step 810, the tracker module 240 periodically controls the crawler module 210 to check whether the videos of the channels recorded in the database 230 is invalid or valid. In the checking step, the crawler module 210 may merely check the channels that are more important, such as the channels subscribed by the user, or the channels and the associated channels thereof subscribed by the user. Alternatively, the crawler module 210 may check all the channels. If there a video becoming invalid, the process enters step 830 from step 820. In step 830, the tracker module 240 query the database 230, that is, in the channels and one or more associated channels of the invalid video, another video having a highest similarity degree with the invalid video is selected according to multiple predetermined video attributes and in step 840, the invalid video is replaced with the another video.

The aforementioned similarity degree is generated by calculating the multi-attribute similarity operator of formula (1) according to the predetermined video attributes. The predetermined attributes may partially or entirely includes a channel name, a title, tags and a length of the video.

Figure 9:
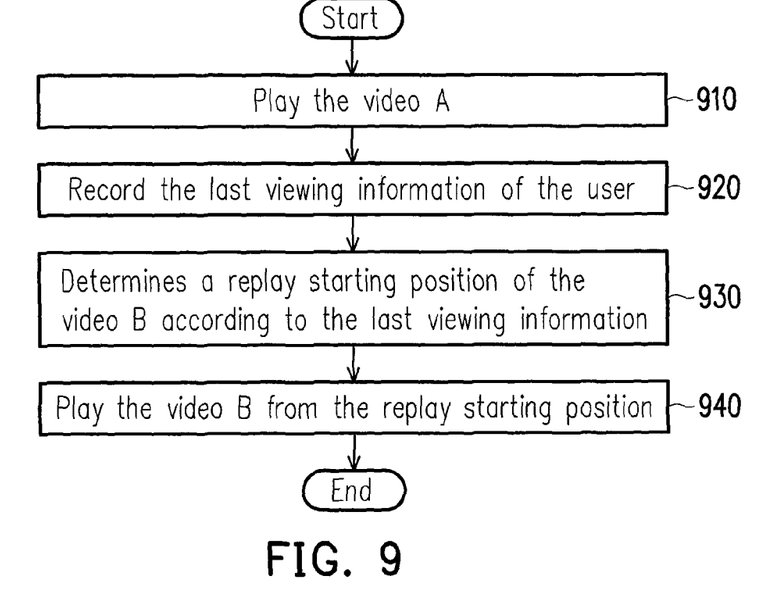
FIG. 9 through FIG. 10 are flowcharts illustrating a method for continuous video replay according to an embodiment of the disclosure.

In addition to the functions that have been described above, the server 110 of the disclosure also provides a function of continuous, cross-device and cross-channel video replay. FIG. 9 is a flowchart illustrating a method for continuous video replay according to an embodiment of the disclosure. In the present embodiment, the user may view videos of each channel by using any playing apparatus connected with the server 110 through a network, any time and any where. The method illustrated in FIG. 9 may be performed by the subscription module 220 of the server 110 with the playing apparatus of the present embodiment.

First, in step 910, the subscription module 220 provides a user interface for the user to select and play a video A of a channel by a playing apparatus D currently used by the user and then, provides a source URL of the video A for the playing apparatus D to play the video A for the user. When the user stops viewing, in step 920, the subscription module 220 records last viewing information of the video A view by the user in the database 230 of the server 110. The last viewing information may include information, such as a last viewing position (a time position in the video A) and a last viewed frame (a last played frame of the video A). The playing module 320 of the playing apparatus 120 shown in FIG. 3 may capture the last viewed frame of the video A and the networking module 310 of the playing apparatus 120 may deliver the captured last viewed frame to the server 110.

Afterward, the user may select and view a video B by using a playing apparatus E connected with the server 110. The playing apparatuses D and E may the same playing apparatus or different playing apparatuses. The videos A and B may be the same video or different videos. The videos A and B belong to the same channel or different channel. For example, the user may view a video by using a desktop computer as the playing apparatus D at home. When going out, the user may continuously view the same video by using a tablet computer as the playing apparatus E. For example, the videos A and B may belong to two different channels, and the two channels are respectively composed of an original version and a high-definition version of the same TV series. The user may switch channels based on different networking bandwidths of the environment where he/she is located, and thus, the video to be played is switched from the video A to the video B. Or, the video A may become invalid between two times of playbacks of the user, and the video B is another video used for replacing the invalid video.

Accordingly, in step 930, the subscription module 220 determines a replay starting position of the video B according to the last viewing information of the video A recorded in the database 230 and in step 940, provides a source URL and the replay starting position of the video B to the playing apparatus E for the playing apparatus E to play the video B from the replay starting position for the user.

Figure 10:
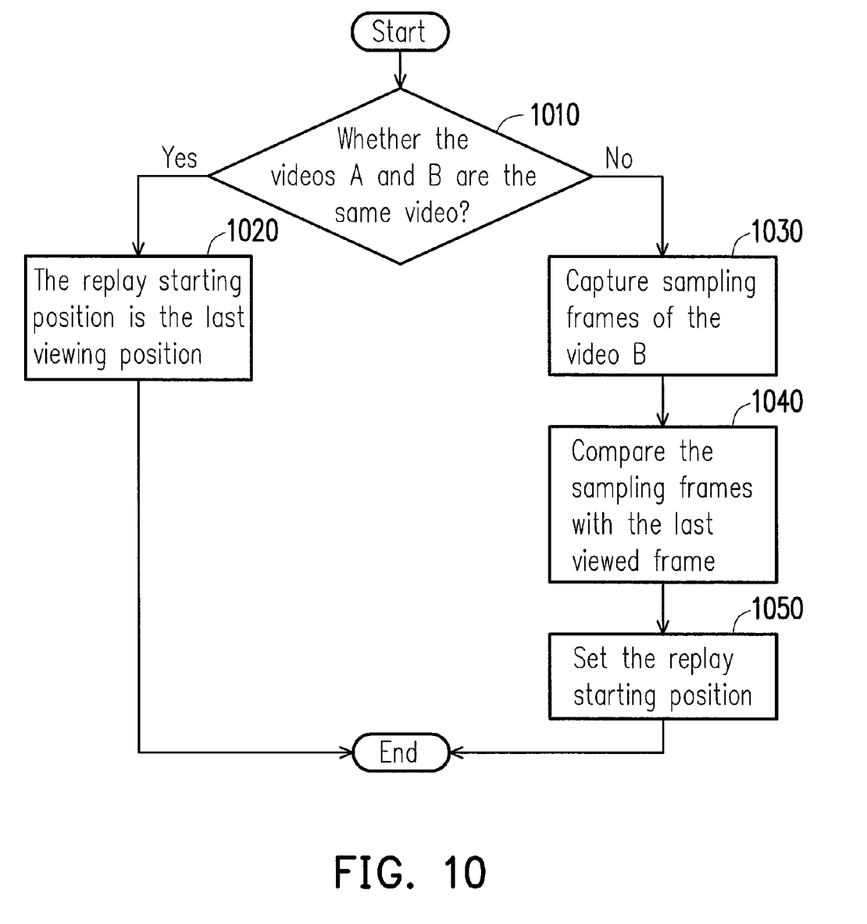

FIG. 10 illustrates a detailed process of step 930 in FIG. 9. First, in step 1010, the subscription module 220 checks whether the video A and the video B are the same video. If true, the process enters step 1020, where the subscription module 220 directly sets the last viewing position as the replay starting position; if not, the last viewing position of the video A may not be applicable to the video B, and the process enters step 1030.

In step 1030, the subscription module 220 captures a sampling frame per a predetermined interval in a segment of a predetermined length centered at the last viewing position in the video B. For example, if the last viewing position is 05:11, i.e. the 5-minute and 11-second position of the video A, wherein the predetermined length is 1 minute, and the predetermined interval is 1 second, the subscription module 220 may captures a sampling frame per second between the segment of 04:41~05:41 in the video. Next, in step 1040, the subscription module 220 compares the sampling frames with the last viewed frame and in step 1050, sets the replay starting position of the video B as a position of the sampling frame that is the most similar to the last viewed frame.

Based on the above, in the disclosure, the crawler module is utilized to gather the source URLs of the videos and the other attributes from numerous sources, and the multi-attribute similarity operator is utilized to automatically create channels of related popular videos. The user subscribes the channels which are searched by using key words or the audio and video channels recommended by using the system or the method for video collection management of the disclosure. The channels provided in the disclosure are similar to the traditional TV channels and the user interface provided in the disclosure is similar to that used in the traditional TV channels. Both are easy to use and wide spread.

By the system or the method for video collection management of the disclosure, the channels subscribed by the user are automatically tracked, new programs are automatically searched, and the videos that are already invalid or no longer match the gathering condition are automatically removed periodically. Thus, the completeness and the playability of the channels can be ensured. Accordingly, the disclosure is applicable to the networking environment having frequently changed videos so as to provide a complete solution for video collection channels.

In addition, in the disclosure, the last viewing information of the user is recorded so that the video can continuously played when the user view the video again. The user can apply the function of continuous video replay to each video by using any playing apparatus in any networking environment at any time.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for continuous video replay, comprising:
playing a first video for a user;
recording a last viewing position and a last viewed frame of the first video viewed by the user in a server of a network;
capturing a sampling frame per a predetermined interval in a segment of a predetermined length centered at the last viewing position in a second video,
wherein the first video and the second video are different videos;
comparing the sampling frames with the last viewed frame;
setting a replay starting position of the second video as a position of the sampling frame that is most similar to the last viewed frame; and
playing the second video from the replay starting position for the user.

2. A system for continuous video replay, comprising:
at least one playing apparatus; and
a server, coupled to the at least one playing apparatus through a network,
providing a source website of a first video for a first playing apparatus among the at least one playing apparatus to play the first video for a user, a last viewing position and a last viewed frame of the first video viewed by the user, capturing a sampling frame per a predetermined interval in a segment of a predetermined length centered at the last viewing position in a second video, comparing the sampling frames with the last viewed frame, setting a replay starting position of the second video as a position of the sampling frame that is most similar to the last viewed frame and providing a source website and the replay starting position of the second video for a second playing apparatus among the at least one playing apparatus to play the second video from the replay starting position for the user, wherein the first video and the second video are different videos.

* * * * *